(No Model.)
J. MARCHAL & L. JOUX.
MAGAZINE CAMERA.
No. 538,736. Patented May 7, 1895.
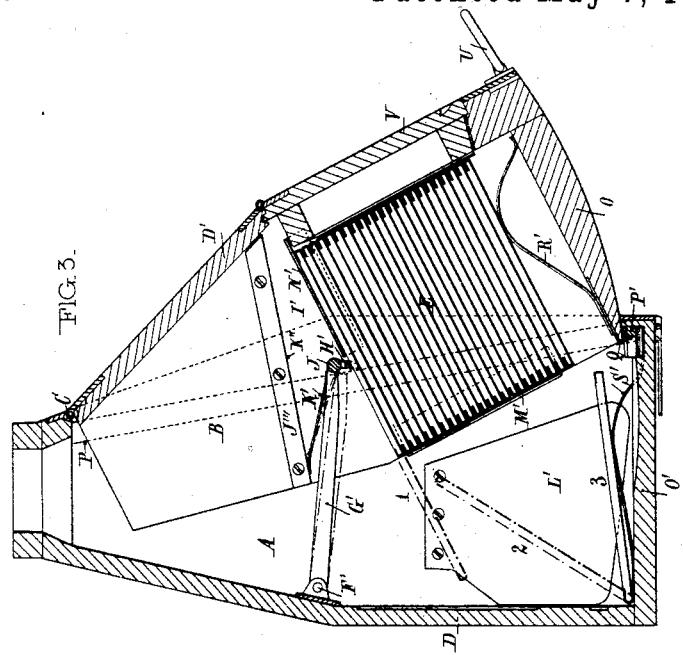
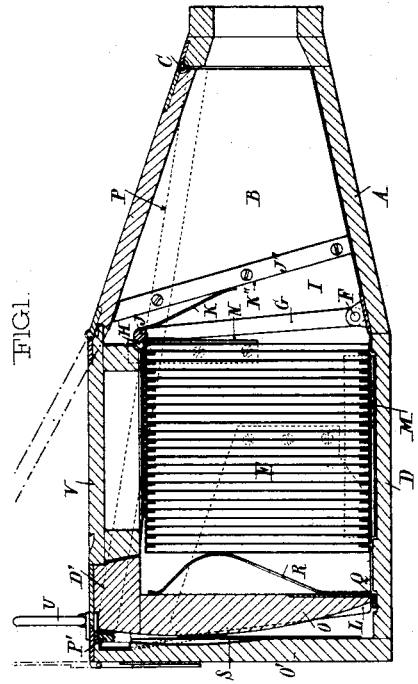
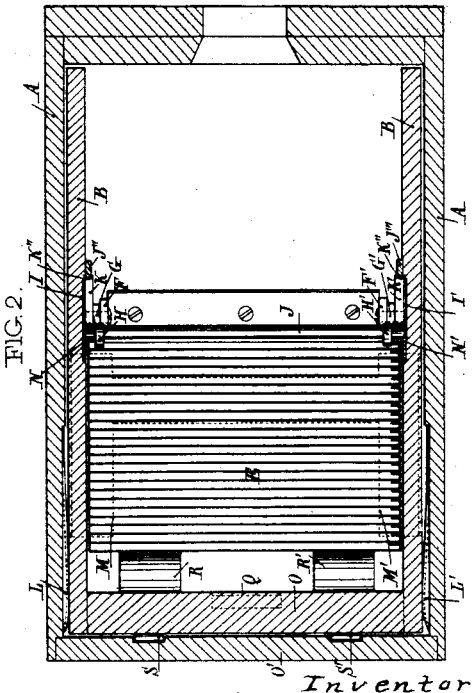
Witnesses:
Thomas Durant
Wallace Murdock
Inventors
Jules Marchal
Lucien Joux
by Church & Church
their Attys

UNITED STATES PATENT OFFICE.

JULES MARCHAL AND LUCIEN JOUX, OF PARIS, FRANCE; SAID MARCHAL ASSIGNOR TO SAID JOUX.

MAGAZINE-CAMERA.

SPECIFICATION forming part of Letters Patent No. 538,736, dated May 7, 1895.

Application filed November 6, 1894. Serial No. 528,066. (No model.) Patented in France June 4, 1894, No. 239,019.

*To all whom it may concern:*

Be it known that we, JULES MARCHAL and LUCIEN JOUX, citizens of the Republic of France, residing at Paris, France, have invented certain new and useful Improvements in Photographic Apparatus, (for which we have obtained Letters Patent in France, No. 239,019, dated June 4, 1894,) of which the following is a specification.

This invention relates to improvements in photographic cameras and particularly to that class wherein a number of plates are carried in the body of the camera itself and adapted to be manipulated or transferred to bring the plates successively into position behind the lens without the necessity of opening the camera or of exposing the plate to the action of light from the exterior.

The objects of the invention are to produce a simple, compact and easily operated device in which the transferring of the plates shall be automatically accomplished without breakage of the plates or injury to their sensitive coatings.

The construction and working of the apparatus which is the subject of this invention will be most easily understood on an examination of the ensuing description in relation to the drawings accompanying this specification.

Figure 1 is a vertical longitudinal section; Fig. 2, a plan, the top being cut away in order to enable the interior arrangements to be seen. Fig. 3 is a section similar to Fig. 1, showing the parts at the moment when a plate is being transferred from the front to the back of the box.

From the drawings it will be evident that the apparatus, whereof the form approximates to that of a double or twin camera, is constituted substantially by the combination of two box or camera sections A and B the latter being contained and operated within the former, after the manner of bellows, and jointed in a similar way, at the upper side at the same end as the lens, by means of a hinge C with an internal shield or cover to protect it against any penetration of the rays of light. The outer box A is open on one side while the inner one B is similarly open on the opposite side so that the side D of the box A (Fig. 3) thus supplies the place of the missing side of B and vice versa the side D' of B acts as substitute for that missing in A.

The form of the front part of the camera is that of a cone viewed in longitudinal section, and in it are fitted the lens, the shutter and the mechanism operating the latter. As these different parts may be made according to any suitable system known, they are not shown in the drawings.

In continuation of the conical portion of the camera follows a rectangular part forming, inside the inner box or camera B, the magazine or plate-holder E, wherein the plates are stored, each held in a separate metallic frame, their number and dimensions varying, of course, with the size of the apparatus.

In the camera box A at the junction of the conical with the oblong portion are arranged two rods G G' jointed to the frame at F F' and having hooks H H' at their free ends. These hooked rods are intended to keep well to the front the plates contained in the magazine formed by the rectangular portion of the camera box B. Sufficient play is provided therefor in the apparatus by means of the recesses I I' formed in the longitudinal side walls of the inner box B. These hooked rods G G' are connected together by a tie J and provided each with a spring K and K' pressing with their free ends against suitable abutments K'' provided for the purpose in recesses I I'. These abutments are enlarged and strengthened by suitable strips J'' J''' along which the springs slide, whereby the rods are kept closely pressed against the front of the first plate-holder or frame in front of the pile of plates in the magazine.

The open surface of each side of the interior of the box B is fitted with two strips united by a tie and symmetrically arranged, forming the ledges M M' which carry the ends of the frames holding the plates E, and of such a length that the first or front plate (on the side facing the lens) is free, and does not rest upon them, so as to allow of its being removed or drawn down by the hooks on the rods G when the sections of the camera are opened. The front plate is maintained in position, in a vertical direction, by the hooks, H H' and, in the horizontal direction, by two ledges or strips N N', arranged symmetrically and at a suitable height on one of the side faces or jambs of the recesses I I' of the camera-box B.

The back O or rear-end of the box B has its outer side rounded to form an arc of a circle struck from the point of oscillation as a center, i. e., the axis of the hinge C on which the box swings, so that the end O is always closed light tight against the upper edge of the back O' of the camera-box A; the joint or closure being formed by longitudinal pads P bearing against the outer faces of the longitudinal walls of the box B. Thus all access of light to the interior of the apparatus is prevented. A transverse spring supported pad P', lodged in a suitable groove in the inner face of the rear end O' of the box A, presses against the circular outer face O of the rear-end of the box B so as to make a tight joint therewith and also thus prevent all access of light to the interior of the apparatus.

A hook-shaped stop Q secured to the open surface of the interior of the inner box B at the rear end O limits the movement of B outside A. Suitable plate-springs R R' arranged symmetrically and parallel to each other on the flat inner surface O exert a strong pressure upon the pile of plates E in the magazine, formed in the rectangular part of the apparatus. Two springs S S' secured to the back O' of the outer box A serve to support the plate, when removed from the front of the pile, at a proper height to enable it to be restored to its place in the magazine, not in front this time, but behind all the other plates. Two other springs formed by flexible cheeks L L' symmetrically arranged and lodged in recesses cut for the purpose in the inner longitudinal walls of the outer box A are intended to guide and hold the plate passed from front to rear, in the direction of its length, in a position adapted to facilitate its replacement in the magazine behind the other plates. When the apparatus is closed, or folded together, these springs S S', L L' are lodged in suitable recesses prepared for them in the interior of A viz, for L L' in the sides and in the back O' for S S'. The ring U also affords a means of handling and manipulating the box B in connection with A. A flap-door V in the side D' of the box B enables the plates E to be stored in the magazine and removed therefrom, as may be required.

Having thus described the construction and arrangement of our apparatus, we will now proceed to set forth and explain the method of its operation and use.

The apparatus being closed, the storing of the plates, in their frames or holders, is effected by opening the door V and introducing them into the magazine in box B. The plates are restrained by plates or ledges N N' in front and supported below by the ledges M M' presenting their sensitized surfaces on the side toward the lens. All the plates being stored away in place and forming a block or pile supported by the springs R R', the first or front plate is seized on its upper edge by the hooks H H' while its lower edge has passed beyond the supports M M' upon which the other plates rest, and is therefore free. The first plate having received the picture, the next step is to abstract it for transfer to the back. To this end the apparatus must be opened out into the position shown in Fig. 3, i. e., placed on end, with the lens uppermost and its axis vertical instead of horizontal; and this is effected by grasping ring U. Then, while holding the box A firmly with one hand, with the other the inner box B is drawn out so that it opens by rotating on its hinge until, when fully opened it is arrested by the stop Q. During and by this movement, all the plates E are carried along with the box B, excepting only the first plate which has just been exposed and received the photographic image this front plate, being held by the hooks H H', as explained and retained by the arms G G' secured to the stationary side D of the camera A, is gradually drawn out from the position hitherto held by it in front of the block or pile of plates, sliding along the frame of the next adjacent plate until it is clear of them, as shown in dotted lines at 1, Fig. 3; the bottom end of the plate, as the motion proceeds, overbalancing the upper end and dropping, when completely clear (i. e., when the movement is arrested) first into an intermediate position shown in dotted lines at 2, Fig. 3 and finally into that shown in full lines at 3, Fig. 3. In this position the plate rests, somewhat slantwise, on the back of A, with its sensitive film still uppermost and turned toward the lens, and sustained horizontally by the springs S S' and vertically (or laterally) by the springs L L' which springs have been liberated by the withdrawal of the box B from within A, and have consequently resumed their normal configurations and positions, in which they are adapted to hold and guide the exposed plate in position and manner suitable for the next stage of the operation. This final stage is effected by simply closing the box B and re-storing it to its former position inside A; whereby, as it were automatically the exposed plate is caused to re-enter the box B at the back, to slide up the guide-springs R R', and thus be pushed into place behind all the other plates, with its sensitive film toward the lens. The box B having thus been completely closed within the camera A, the original relative positions of all the parts are re-established as shown in Figs. 1 and 2; excepting that the plate which was in front, has undergone exposure, and is now behind all the rest, having been passed from the top of the "pack" of slides to the bottom, by a single swing of the box B out and in again; while the still unexposed plate, which was second, now occupies the first or front place, ready for immediate exposure, having its sensitive film turned to the lens, and being, like its predecessor, sustained in front by the plates or flanges N N', carried by the hooks H H' above, unsupported by the ledges M M', and free, after exposure, to pass through the same process of removal from front to rear hereinbefore described.

We claim—

1. In a photographic camera, the combination with the two boxes hinged together at the forward end, telescoping one within the other at the rear end and light excluding packings between the two boxes, of a plate holder and an extractor carried one by each of the boxes, a spring for advancing the plates through the holder and a means for holding the extractor in engagement with the topmost plate in the holder; substantially as described.

2. In a photographic camera, the combination with the two boxes hinged together at the forward end so as to telescope one with the other at the rear end, a plate holder in the inner box and a spring for advancing the plates through said holder, of an extractor carried by the outer box and cooperating with the forward plate of the pile, a spring for holding said extractor in engagement with the plate and a spring buffer for receiving the plate when released by the extractor; substantially as described.

3. In a photographic camera, the combination with the two boxes hinged together at the forward end and telescoping together at the rear end, the plate holder carried by the inner box and the spring for advancing the plates through said holder from front to rear, of the spring pressed arms carried by the outer box and projecting into the inner box forward of the plate holder, the hooks on said arms for co-operating with the topmost plate in the holder to extract the same when the boxes are separated and movable guides in the outer box for directing the extracted plate into the holder in rear of the pile of plates, whereby when the two boxes are brought together said guides may be moved out of the path of the same; substantially as described.

4. In a photographic camera the combination with the two telescoping boxes hinged together adjacent to the lens opening, a plate holder carried by the inner box with means for advancing the plates toward the lens opening, an extractor carried by the outer box for removing a plate from the front of the holder as the boxes are separated, a buffer spring for catching the plate so removed and spring guides for directing the plate into the plate holder in rear of the pile of plates therein as the two boxes are brought together; substantially as described.

5. In a photographic camera, the combination with the telescoping boxes hinged together adjacent to the lens opening, the plate holder carried by the inner box and the spring for advancing the plates through said holder, of the two arms hinged in the outer box and projecting into the inner box with hooks thereon for extracting the topmost plate in the holder, a spring for holding said arms advanced, a guide on the inner box with which said spring cooperates whereby the pressure on the arms is equalized, springs at the back of the outer box for catching the plate extracted by the hook and side springs for directing the plate into the plate holder in rear of the pile of plates; substantially as described.

In testimony whereof we have hereunto set our hands in the presence of the two subscribing witnesses.

JULES MARCHAL.
LUCIEN JOUX.

Witnesses:
LOUIS SULLIGE,
D. T. S. FULLER.